US012661897B2

(12) United States Patent

Matsuzaki et al.

(10) Patent No.: US 12,661,897 B2
(45) Date of Patent: Jun. 23, 2026

(54) LIQUID EJECTING APPARATUS

(71) Applicant: SEIKO EPSON CORPORATION, Tokyo (JP)

(72) Inventors: Kazutoshi Matsuzaki, Shiojiri (JP); Nobuyuki Nishi, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 377 days.

(21) Appl. No.: 18/355,456

(22) Filed: Jul. 20, 2023

(65) Prior Publication Data

US 2024/0025177 A1 Jan. 25, 2024

(30) Foreign Application Priority Data

Jul. 20, 2022 (JP) ................................ 2022-115251

(51) Int. Cl.

*B41J 2/17* (2006.01)
*B41J 2/165* (2006.01)
*B41J 2/175* (2006.01)
*B41J 11/00* (2006.01)
*B41J 11/04* (2006.01)

(52) U.S. Cl.

CPC ......... *B41J 2/1721* (2013.01); *B41J 2/16508* (2013.01); *B41J 2/175* (2013.01); *B41J 11/007* (2013.01); *B41J 11/04* (2013.01); *B41J 2/1728* (2024.05)

(58) Field of Classification Search

None

See application file for complete search history.

(56) References Cited

U.S. PATENT DOCUMENTS 8,770,739 B2 * 7/2014 Kikkawa .............. B41J 13/0009 347/105
9,994,024 B2 * 6/2018 Takino ................ B41J 2/16588
2016/0221347 A1 8/2016 Kanaya et al.
2019/0243300 A1 8/2019 Matsuo et al.

FOREIGN PATENT DOCUMENTS

CN 104647904 A 5/2015
JP 2007160825 A 6/2007
JP 2019136915 8/2019

OTHER PUBLICATIONS

Office Action for CN Patent Application No. 202310878818.2, issued on Nov. 5, 2025, 14 pages.

* cited by examiner

*Primary Examiner* — Alejandro Valencia
(74) *Attorney, Agent, or Firm* — CHIP LAW GROUP

(57) ABSTRACT

A liquid ejecting apparatus includes: a liquid ejecting portion that ejects a liquid onto a medium which is transported and has an ejection surface from which the liquid is ejected and which intersects a horizontal direction; a transport path that is disposed upstream of a position facing the liquid ejecting portion and is positioned vertically below the liquid ejecting portion; and an opening/closing member that is configured to be opened and closed with respect to a side surface of an apparatus body including the liquid ejecting portion, forms the transport path when closed, and at least partially opens the transport path when opened. A liquid collecting portion that collects the liquid leaking from the liquid ejecting portion is provided on the opening/closing member at a position vertically below the ejection surface.

10 Claims, 11 Drawing Sheets

LIQUID EJECTING APPARATUS

The present application is based on, and claims priority from JP Application Serial Number 2022-115251, filed Jul. 20, 2022, the disclosure of which is hereby incorporated by reference herein in its entirety.

BACKGROUND

1. Technical Field

The present disclosure relates to a liquid ejecting apparatus that ejects a liquid onto a medium.

2. Related Art

JP-A-2007-160825 discloses that an ink jet type roll paper printer is provided with a leaking ink collecting unit for collecting leaking ink inside the apparatus. Further, JP-A-2019-136915 discloses that, in an ink jet recording apparatus, an ejecting port surface of a recording head and a platen facing the ejecting port surface are inclined about 45 degrees with respect to a horizontal direction.

As in the ink jet recording apparatus of JP-A-2019-136915, when the ejecting port surface of the recording head and the platen facing the ejecting port surface are inclined with respect to the horizontal direction, ink leaking from an ejecting port of the recording head tends to drip downward without being caught by the platen. In some cases, the ink jet recording apparatus is provided with an opening/closing member that opens the inside of the apparatus such that a jammed paper sheet can be removed when a paper jam occurs. When the ink dripping downward from the recording head flows to the opening/closing member, the ink may drip downward in a state where the opening/closing member is opened and stain a floor surface outside an installation region of the ink jet recording apparatus. No particular consideration is given to such technical problems in the apparatuses described in JP-A-2007-160825 and JP-A-2019-136915.

SUMMARY

According to an aspect of the present disclosure, a liquid ejecting apparatus includes: a liquid ejecting portion that ejects a liquid onto a medium which is transported and has an ejection surface from which the liquid is ejected and which intersects a horizontal direction; a transport path that is disposed upstream of a position facing the liquid ejecting portion and is positioned vertically below the liquid ejecting portion; and an opening/closing member that is configured to be opened and closed with respect to a side surface of an apparatus body including the liquid ejecting portion, forms the transport path when closed, and at least partially opens the transport path when opened. A liquid collecting portion that collects the liquid leaking from the liquid ejecting portion is provided on the opening/closing member at a position vertically below the ejection surface.

DESCRIPTION OF EMBODIMENTS

Figure 1:
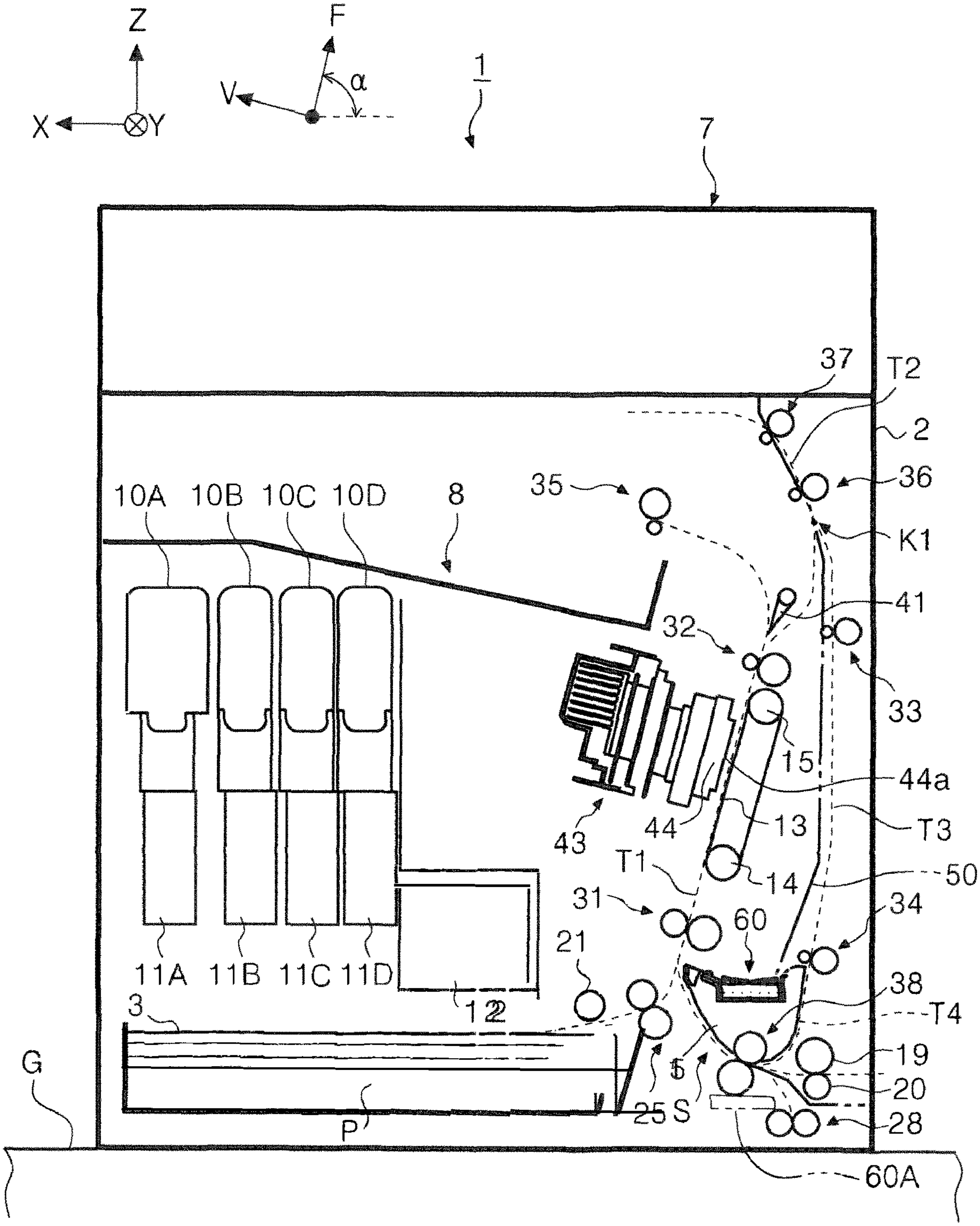
FIG. 1 is a view illustrating a medium transport path of a printer.

Hereinafter, the present disclosure will be schematically described. A liquid ejecting apparatus according to a first aspect includes: a liquid ejecting portion that ejects a liquid onto a medium which is transported and has an ejection surface from which the liquid is ejected and which intersects a horizontal direction; a transport path that is disposed upstream of a position facing the liquid ejecting portion and is positioned vertically below the liquid ejecting portion; and an opening/closing member that is configured to be opened and closed with respect to a side surface of an apparatus body including the liquid ejecting portion, forms the transport path when closed, and at least partially opens the transport path when opened. A liquid collecting portion that collects the liquid leaking from the liquid ejecting portion is provided on the opening/closing member at a position vertically below the ejection surface.

According to this aspect, in the liquid ejecting apparatus including the liquid ejecting portion having the ejection surface from which the liquid is ejected and which intersects the horizontal direction, the transport path that is positioned vertically below the liquid ejecting portion, and the opening/closing member that is configured to be opened and closed with respect to a side surface of the apparatus body including the liquid ejecting portion, forms the transport path when closed, and at least partially opens the transport path when opened, the liquid collecting portion that collects the liquid leaking from the liquid ejecting portion is provided on the opening/closing member at a position vertically below the ejection surface. Therefore, it is possible to prevent a floor surface outside an installation region of the liquid ejecting apparatus from being stained with the liquid dripping downward in a state where the opening/closing member is opened. The ejection surface intersecting the horizontal direction also includes the ejection surface orthogonal to the horizontal direction.

According to a second aspect, in the liquid ejecting apparatus according to the first aspect, at least a part of the liquid collecting portion and at least a part of the ejection surface overlap each other when viewed from above in a state where the opening/closing member is closed. According to this aspect, at least a part of the liquid collecting portion and at least a part of the ejection surface overlap each other when viewed from above in a state where the opening/closing member is closed, so that the liquid leaking from the liquid ejecting portion can be more reliably collected.

According to a third aspect, the liquid ejecting apparatus according to the second aspect further includes a medium support portion that supports the medium at the position facing the liquid ejecting portion. A part of the medium support portion is positioned vertically below the liquid ejecting portion, and at least a part of the liquid collecting portion and at least a part of the medium support portion overlap each other when viewed from above in a state where the opening/closing member is closed.

According to this aspect, at least a part of the liquid collecting portion and at least a part of the medium support portion overlap each other when viewed from above in a state where the opening/closing member is closed, so that the liquid leaking from the liquid ejecting portion can be more reliably collected. This aspect is not limited to the second aspect and may be applied to the first aspect.

According to a fourth aspect, in the liquid ejecting apparatus according to the first aspect, the transport path includes a path portion that is vertically convex downward and bends and inverts the medium upward, and the liquid collecting portion is arranged using an inner region of the path portion.

According to this aspect, as the liquid collecting portion is arranged using the inner region of the path portion, an increase in size of the apparatus can be suppressed by effectively utilizing the inner region of the path portion. This aspect is not limited to the first aspect and may be applied to the second or third aspect.

According to a fifth aspect, in the liquid ejecting apparatus according to the fourth aspect, the liquid collecting portion is positioned vertically lower than a downstream end of the path portion. In a case where the liquid collecting portion is positioned vertically higher than the downstream end of the path portion when the opening/closing member is opened and closed, the liquid collecting portion may hinder opening and closing of the opening/closing member. According to this aspect, the liquid collecting portion is positioned vertically lower than the downstream end of the path portion, and it is thus possible to obtain a configuration in which the liquid collecting portion hardly hinders opening and closing of the opening/closing member.

According to a sixth aspect, in the liquid ejecting apparatus according to the first aspect, the liquid collecting portion includes a storage portion that stores the liquid and a guide portion that extends outward from the storage portion and guides the liquid to the storage portion.

According to this aspect, the liquid collecting portion includes a storage portion that stores liquid and a guide portion that extends outward from the storage portion and guides the liquid to the storage portion. Therefore, it is possible to expand a region for receiving the liquid without increasing the size of the storage portion. As a result, both expansion of the region for receiving the liquid and suppression of the increase in size of the apparatus can be achieved. This aspect is not limited to the first aspect and may be applied to any one of the second to fifth aspects.

According to a seventh aspect, in the liquid ejecting apparatus according to the sixth aspect, the liquid collecting portion includes a cover that covers the storage portion. According to this aspect, the cover that covers the storage portion is provided, and thus, it is possible to prevent a user from inadvertently accessing the inside of the storage portion.

According to an eighth aspect, in the liquid ejecting apparatus according to the seventh aspect, the cover has an inclined surface inclined toward the storage portion. According to this aspect, the cover has the inclined surface inclined toward the storage portion. Therefore, the liquid falling onto the cover can flow down to the storage portion and be effectively collected.

According to a ninth aspect, in the liquid ejecting apparatus according to the sixth aspect, an absorbing material that absorbs the liquid is provided in the storage portion. According to this aspect, the absorbing material that absorbs the liquid is provided in the storage portion, and thus, it is possible to reduce a risk of the liquid leaking from the storage portion. This aspect is not limited to the sixth aspect and may be applied to the seventh or eighth aspect.

According to a tenth aspect, the liquid ejecting apparatus according to the sixth aspect further includes a path forming member that forms the transport path. The path forming member has a first portion that forms a part of the transport path and a second portion that receives the liquid and guides the liquid to the guide portion, the second portion has a recess formed at a portion that transfers the liquid to the guide portion, and the guide portion has a rib fitting into the recess.

According to this aspect, the path forming member that forms the transport path has the first portion that forms a part of the transport path and the second portion that receives the liquid and guides the liquid to the guide portion. Therefore, the path forming member exhibits a function of receiving the liquid and a function of guiding the received liquid to the guide portion, so that the liquid leaking from the liquid ejecting portion can be more reliably collected in the storage portion. Further, the second portion has the recess formed at the portion that transfers the liquid to the guide portion, and the guide portion has the rib fitting into the recess, so that the liquid can be transferred from the second portion to the guide portion. Therefore, it is possible to prevent the liquid from leaking to other places without being transferred from the second portion to the guide portion. This aspect is not limited to the sixth aspect and may be applied to any one of the seventh to ninth aspects.

According to an eleventh aspect, in the liquid ejecting apparatus according to the first aspect, the liquid collecting portion serves as a first liquid collecting portion, and a second liquid collecting portion that collects the liquid leaking from the liquid ejecting portion is provided vertically below the first liquid collecting portion on a lower side of the opening/closing member.

According to this aspect, the liquid collecting portion serves as the first liquid collecting portion, and the second liquid collecting portion that collects the liquid leaking from the liquid ejecting portion is provided vertically below the first liquid collecting portion on the lower side of the opening/closing member, so that it is possible to more reliably prevent the liquid from dripping downward in a state where the opening/closing member is opened. This aspect is not limited to the first aspect and may be applied to any one of the second to tenth aspects.

According to a twelfth aspect, in the liquid ejecting apparatus according to any one of the first to eleventh aspects, the ejection surface intersects both the horizontal direction and a vertical direction. According to this aspect, in a configuration in which the ejection surface intersects both the horizontal direction and the vertical direction, the effects of any one of the first to eleventh aspects described above can be obtained.

Hereinafter, the present disclosure will be described in detail. In the following description, an ink jet printer 1 that performs recording by ejecting ink, which is an example of the liquid, onto a medium represented by a recording sheet will be described as an example of the liquid ejecting apparatus. Hereinafter, the ink jet printer 1 will be simply referred to as the printer 1. An XYZ coordinate system illustrated in each drawing is an orthogonal coordinate system. A Y-axis direction is a direction that intersects a medium transport direction, that is, a medium width direction, and is also an apparatus depth direction. In the Y-axis direction, a +Y direction is a direction from a front surface of the apparatus to a rear surface of the apparatus, while a −Y direction is a direction from the rear surface of the apparatus to the front surface of the apparatus.

An X-axis direction is an apparatus width direction, and a +X direction is the left side and a −X direction is the right side when viewed by an operator of the printer 1. A Z-axis direction is the vertical direction, which is a direction normal to a mounting surface G of the printer 1, that is, an apparatus height direction. In the Z-axis direction, a +Z direction is an upward direction, and the −Z direction is the downward direction. Hereinafter, a side to which the medium is transported may be referred to as "downstream", and the opposite side may be referred to as "upstream". Further, in FIG. 1, a medium transport path is indicated by a broken line. In the printer 1, the medium is transported through the medium transport path indicated by the broken line in FIG. 1.

An F-axis direction is a medium transport direction between a line head 44 and a transport belt 13, which will be described later, that is, in a recording region. A +F direction represents downstream in the transport direction, and a −F direction opposite thereto represents upstream in the transport direction. A V-axis direction is a direction perpendicular to the F-axis direction.

The printer 1 is a multi-function machine including a scanner unit 7 provided on an upper side of an apparatus body 2, the scanner unit 7 being an example of an image reading apparatus. The printer 1 is configured such that an extension unit (not illustrated) can be coupled to a lower side of the apparatus body 2 and the medium can be fed from the extension unit. Reference sign 28 in FIG. 1 denotes a transport roller pair that transports the medium fed from the extension unit (not illustrated) into the apparatus body 2.

The apparatus body 2 includes a first medium cassette 3 that accommodates the medium, the first medium cassette 3 being positioned on the lower side of the apparatus body 2. A pick roller 21 is provided for the first medium cassette 3 to transport the accommodated medium in the −X direction. The medium transported by the pick roller 21 is transported toward a transport roller pair 31 by the feeding roller pair 25. Hereinafter, unless otherwise specified, the term "roller pair" refers to a roller pair including a drive roller that is driven by a drive source (not illustrated) to apply a transport force to a medium, and a driven roller that is rotated by being in contact with the drive roller or the medium. A supply roller 19 and a separation roller 20 provided near the transport roller pair 38 constitute a roller pair that transports the medium from a supply tray (not illustrated in FIG. 1).

The medium that receives the transport force from the transport roller pair 31 is transported to a position between the line head 44, which is an example of the recording head, and the transport belt 13, that is, to a position facing the line head 44. A medium transport path from the transport roller pair 31 to a transport roller pair 32 is hereinafter referred to as a recording transport path T1. The line head 44, which is an example of the liquid ejecting portion, is included in a head unit 43. The line head 44 performs recording by ejecting the ink onto a surface of the medium. The line head 44 is an ink ejecting head configured such that ink ejecting nozzles cover the entire region in the medium width direction and is configured as an ink ejecting head capable of performing recording on the entire region in the medium width direction without moving in the medium width direction. However, the ink ejecting head is not limited thereto and may be of a type that is mounted on a carriage and ejects ink while moving in the medium width direction.

The head unit 43 is provided so as to be able to move forward and backward with respect to the recording transport path T1 and move between a recording position near the recording transport path T1 to perform recording on the medium and a retreat position away from the recording transport path T1. FIG. 1 illustrates a state where the head unit 43 is at the recording position, and recording is performed on the medium in this state.

Reference signs 10A, 10B, 10C, and 10D denote ink containing portions as liquid containing portions. The ink ejected from the line head 44 is supplied to the line head 44 from each ink containing portion via a tube (not illustrated). The ink containing portions 10A, 10B, 10C, and 10D are provided so as to be attachable to and detachable from mounting portions 11A, 11B, 11C, and 11D, respectively. Reference sign 12 denotes a waste liquid accommodating portion that accommodates the ink as a waste liquid ejected from the line head 44 toward a flushing cap (not illustrated) for maintenance.

The transport belt 13 is an endless belt that is looped around pulleys 14 and 15 and rotates when at least one of the pulleys 14 and 15 is driven by a motor (not illustrated). The medium is transported through a position facing the line head 44 while adhering to a belt surface of the transport belt 13. A known adhesion method such as an air suction method or an electrostatic adhesion method can be used for adhesion of the medium to the transport belt 13. The transport belt 13 is an example of the medium support portion that supports the medium.

Here, the recording transport path T1 passing through the position facing the line head 44 intersects both the horizontal direction and the vertical direction and transports the medium upward. That is, the F-axis direction intersects both the horizontal direction and the vertical direction. Accordingly, an ejection surface 44*a* from which the ink is ejected in the line head 44 is parallel to the F-axis direction and also intersects both the horizontal direction and the vertical direction. In the present embodiment, an angle $\alpha$ formed by the F-axis direction and the horizontal direction is 75°. The angle $\alpha$ is in a range of $0° < \alpha \leq 90°$ and may be appropriately changed to other angles. For example, the angle $\alpha$ may be set to be within a range of $45° \leq \alpha \leq 80°$. The angle $\alpha$ may be in a range of $60° \leq \alpha \leq 80°$ when reducing the size of the apparatus body 2.

The medium having a first surface on which recording has been performed by the line head 44 is further transported upward by the transport roller pair 32 positioned downstream of the transport belt 13. A flap 41 is provided downstream of the transport roller pair 32 and switches the medium transport direction. When the medium is discharged as is, the medium transport path is switched by the flap 41 such that the medium moves toward the transport roller pair 35 on the upper side, and the medium is discharged toward a discharge tray 8 by the transport roller pair 35.

When performing recording on a second surface in addition to the first surface of the medium, the medium transport direction is directed toward a branch position K1 by the flap 41. Then, the medium passes through the branch position K1 and enters a switchback path T2. In the present embodiment, the switchback path T2 is a medium transport path above the branch position K1. Transport roller pairs 36 and 37 are provided on the switchback path T2. The medium entering the switchback path T2 is transported upward by the transport roller pairs 36 and 37, and once a trailing edge of the medium passes through the branch position K1, a rotating direction of the transport roller pairs 36 and 37 is switched, so that the medium is transported downward.

A coupling path T3 is coupled to the switchback path T2. In the present embodiment, the coupling path T3 is a medium transport path from the branch position K1 to a transport roller pair 34. Further, an inverting path T4 is coupled to the coupling path T3. In the present embodiment, the inverting path T4 is a medium transport path from the transport roller pair 34 to the transport roller pair 31 through a transport roller pair 38. The inverting path T4 is a transport path upstream of the position facing the line head 44 and positioned vertically below the line head 44. The inverting path T4 includes a path portion S that is vertically convex downward and bends and inverts the medium upward. In the present embodiment, the entire inverting path T4 is configured as the path portion S, but the path portion S may be a part of the inverting path T4. The medium transported downward from the branch position K1 reaches the transport roller pair 38 by receiving a transport force from the transport roller pairs 33 and 34, is bent and inverted, and is transported to the transport roller pair 31.

The second surface of the medium transported to the position facing the line head 44 again faces the line head 44, the second surface being opposite to the first surface on which recording has already been performed. As a result, recording can be performed by the line head 44 on the second surface of the medium.

Figure 2:
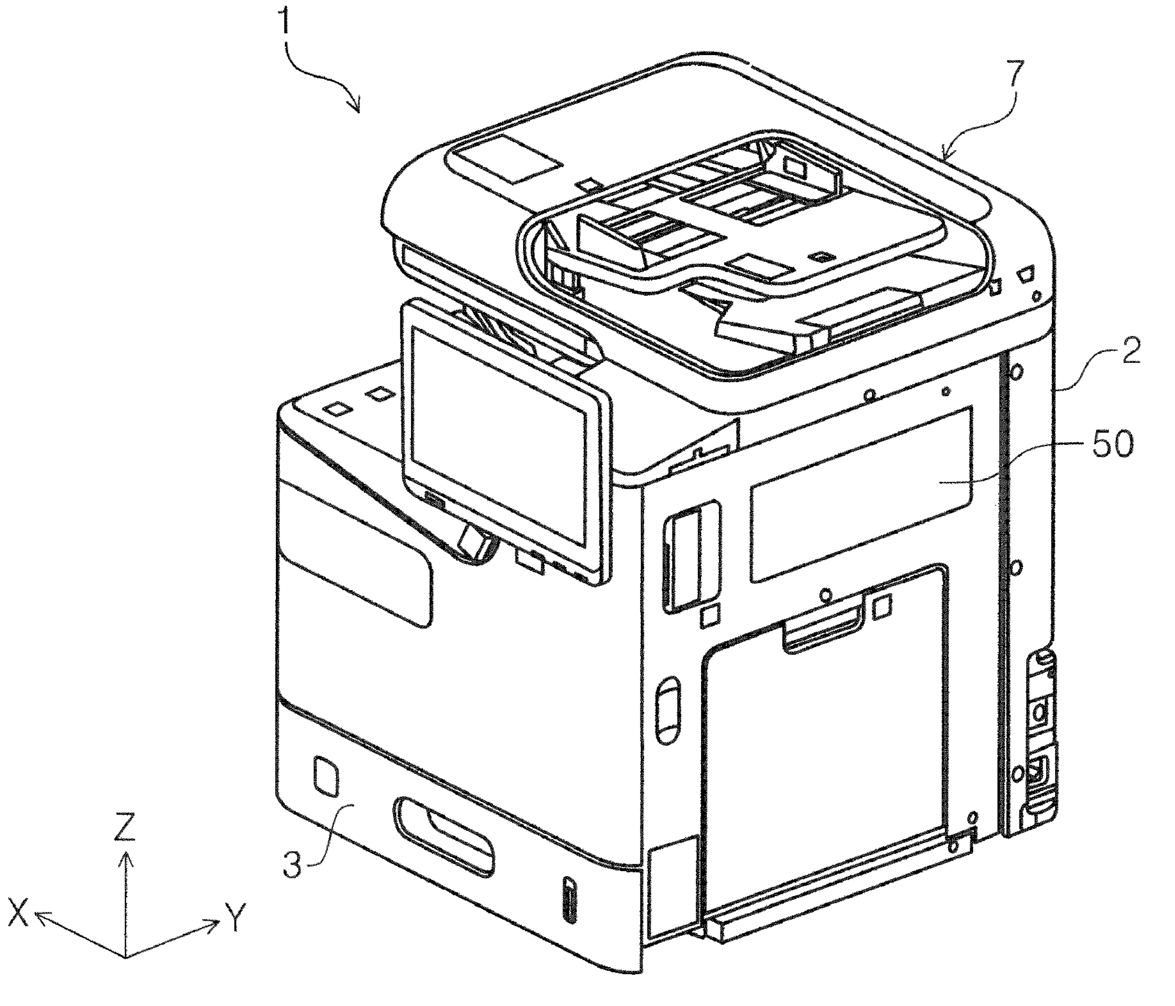
FIG. 2 is an external perspective view of the printer with a side door closed.
Figure 3:
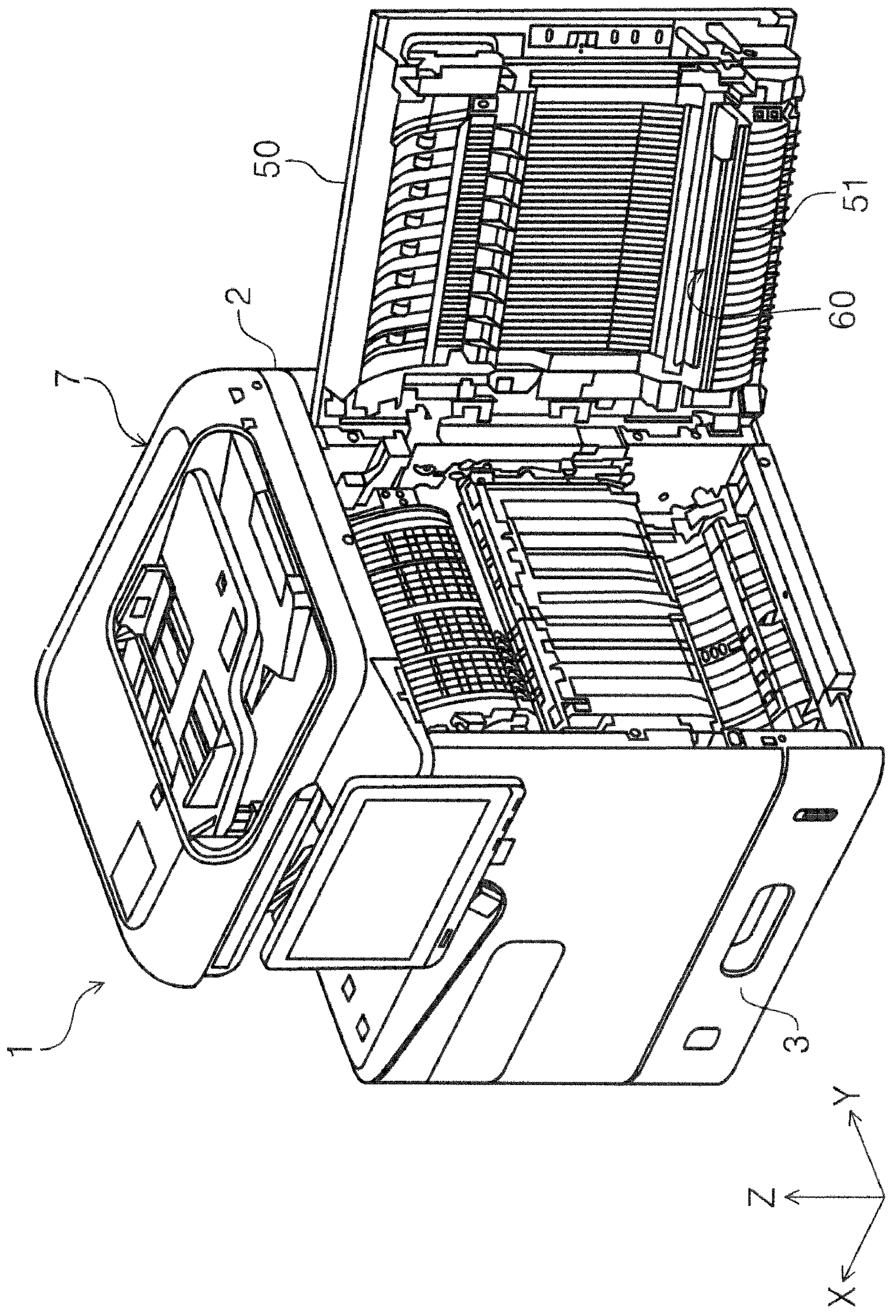
FIG. 3 is an external perspective view of the printer with the side door opened.

Next, a first liquid collecting portion 60 will be described with reference to FIG. 2 and subsequent drawings. As illustrated in FIGS. 2 and 3, a side door 50 as the opening/closing member that is openable and closable is provided on a −X-direction side surface, that is, a right side surface, of the apparatus body 2. The inside of the apparatus body 2 is exposed by opening the side door 50 as illustrated in FIG. 3. As illustrated in FIG. 1, the side door 50 includes the −X-direction roller of each of the transport roller pairs 36 and 37, the transport roller pairs 33 and 34, the supply roller 19, the separation roller 20, and the +Z-direction roller of the transport roller pair 38. When the side door 50 is opened, the switchback path T2 is opened and a part of the inverting path T4 is opened. As a result, for example, when a paper jam occurs in the inverting path T4, the jammed paper sheet can be removed.

A path forming member 51 is provided on a lower side of the side door 50. The path forming member 51 is a member that forms an inner side of the inverting path T4 and has a shape that protrudes vertically downward. The first liquid collecting portion 60 is provided on an upper side of the path forming member 51. The first liquid collecting portion 60 is positioned vertically below the ejection surface 44*a* of the line head 44.

As illustrated in FIGS. 4, 5, 6, and 7, the first liquid collecting portion 60 according to the present embodiment includes a liquid storage tray 61, a first liquid absorbing material 62, a second liquid absorbing material 63, and a cover 64. The liquid storage tray 61 is a member screw-fixed to the path forming member 51, is formed in a tray shape as a whole, and includes a storage portion 61*a* that stores the ink. The first liquid absorbing material 62 is provided in the storage portion 61*a*. Materials capable of absorbing and retaining the ink are used for the first liquid absorbing material 62 and the second liquid absorbing material 63 to be described later. Various materials such as sponge and non-woven fabric are applicable, and in the present embodiment, non-woven fabric is used as an example. The liquid storage tray 61 serves as a base of the first liquid collecting portion 60 and is fixed to the path forming member 51 by screws. In other words, the first liquid collecting portion 60 is configured to be attachable to and detachable from the side door 50.

In addition to the storage portion 61*a*, the liquid storage tray 61 includes a first guide portion 61*b*, a second guide portion 61*c*, and a third guide portion 61*d* that extend outward from the storage portion 61*a* and guide the ink to the storage portion 61*a*. In the following description of the configuration of the first liquid collecting portion 60 based on the X-axis direction, the Y-axis direction, and the Z-axis direction, each direction means the direction in a state where the side door 50 is closed. The first guide portion 61*b* is provided in the +X direction with respect to the storage portion 61*a*. The second guide portion 61*c* is provided in the −X direction with respect to the storage portion 61*a*. The third guide portion 61*d* is provided in the +Y direction with respect to the storage portion 61*a*.

The first guide portion 61*b* is formed to be inclined upward in the +X direction and guides the received ink in the −X direction. The second guide portion 61*c* is formed to be inclined upward in the −X direction and guides the received ink in the +X direction. A plurality of ribs extending in the Y-axis direction are formed in the third guide portion 61*d* in the X-axis direction and guide the received ink in the −Y direction through capillary action. A part accommodating portion 61*h* is formed in the −Y direction with respect to the storage portion 61*a*, and a service part 65 can be accommodated therein. However, an installation region of the part accommodating portion 61*h* may be used as the storage portion 61*a*. Further, an installation region of the third guide portion 61*d* may be used as the storage portion 61*a*.

A plurality of first ribs 61*e* and second ribs 61*f* are formed in the first guide portion 61*b* in the X-axis direction. In each drawing, only some of the plurality of first ribs 61*e* and second ribs 61*f* are illustrated with the reference signs in order to avoid complicating the drawings. The first ribs 61*e* and the second ribs 61*f* are formed integrally with the liquid storage tray 61. The first ribs 61*e* each include a first rib 61*e*-1 provided integrally with the second rib 61*f* and a first rib 61*e*-2 provided independently.

Figure 8:
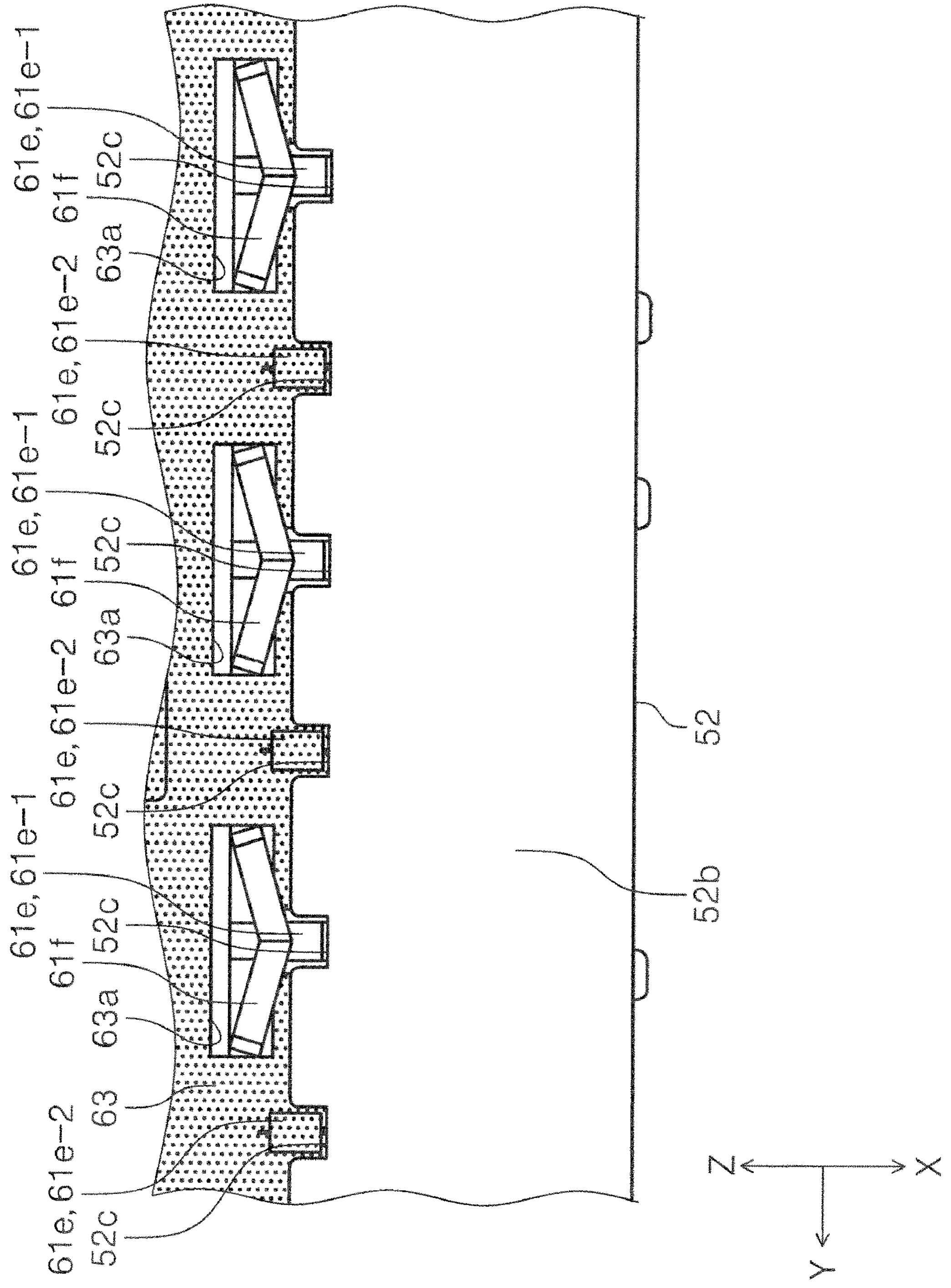
FIG. 8 is a plan view of a first guide portion.
Figure 9:
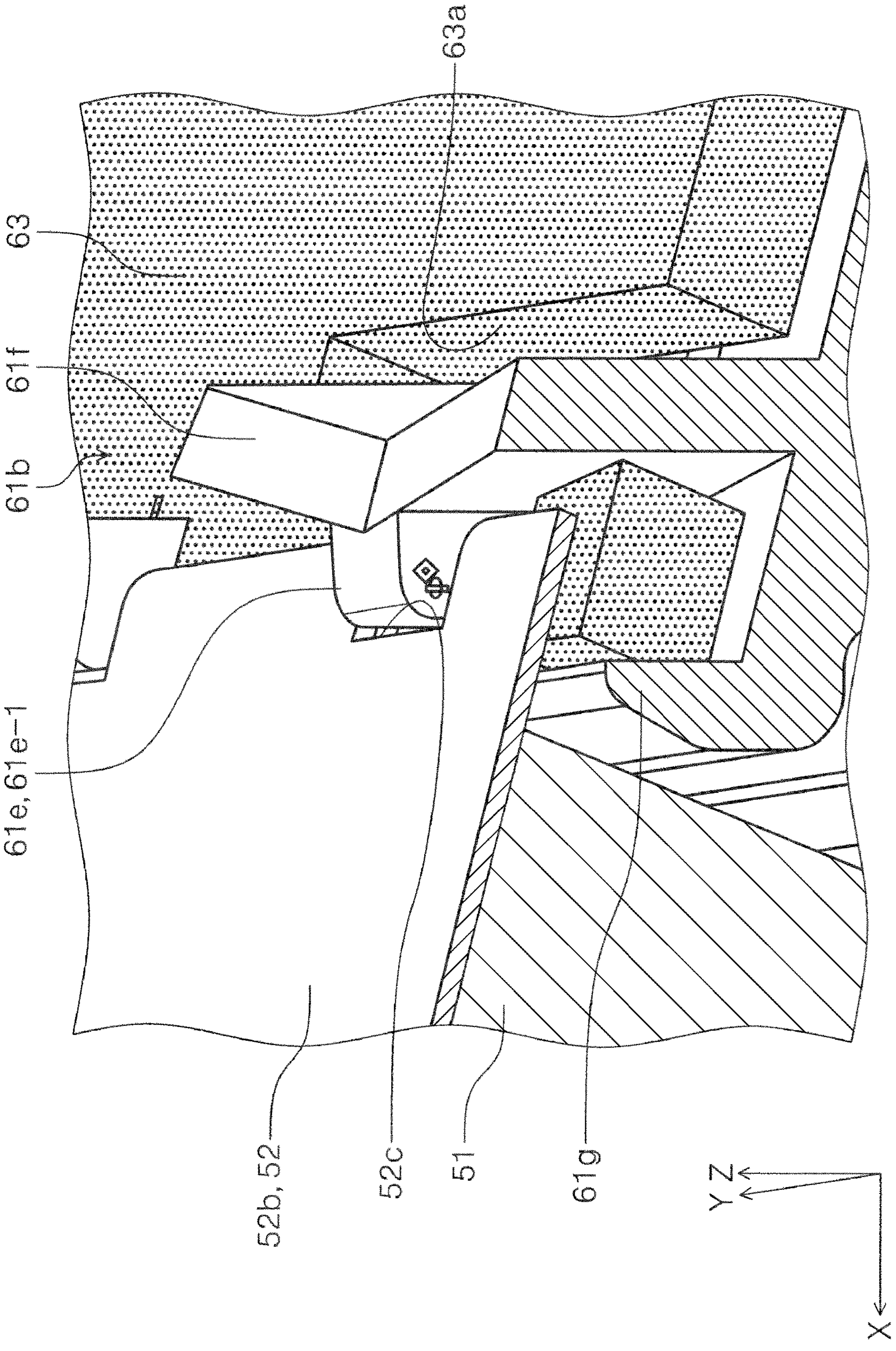
FIG. 9 is a cross-sectional perspective view of the first guide portion.

The second liquid absorbing material 63 is provided in the first guide portion 61*b*. As illustrated in FIGS. 8 and 9, a plurality of openings 63*a* are formed in the second liquid absorbing material 63 in the X-axis direction, and the first ribs 61*e* and the second ribs 61*f* are positioned inside the openings 63*a*. Furthermore, a wall portion 61*g* extending in the +Z direction is formed in the Y-axis direction at a +X-direction end portion of the first guide portion 61*b*. The second liquid absorbing material 63 is restricted from moving in the +X direction by the wall portion 61*g* and is restricted from coming into contact with the path forming member 51.

A cover 64 is provided on the storage portion 61*a*. The cover 64 is fixed to the liquid storage tray 61 by screws. The cover 64 has an opening 64*b* formed in the Y-axis direction and inclined surfaces 64*a* formed on both sides of the opening 64*b* in the Y-axis direction. The inclined surfaces 64*a* are inclined downward toward the opening 64*b* in the Y-axis direction. The ink received by the inclined surfaces 64*a* is directed toward the opening 64*b* and falls onto the storage portion 61*a*.

Figure 4:
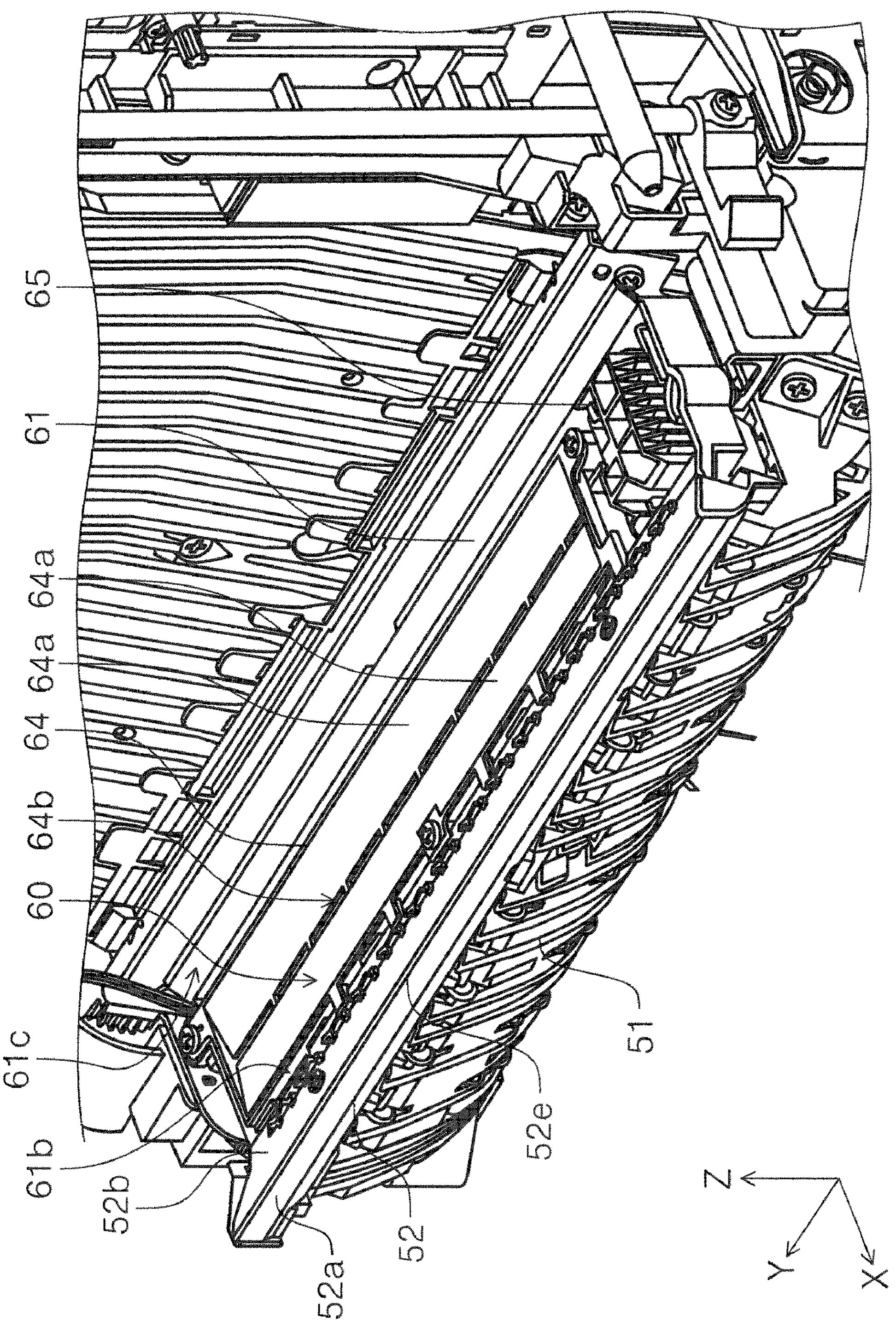
FIG. 4 is a perspective view of a first liquid collecting portion provided on the side door.
Figure 5:
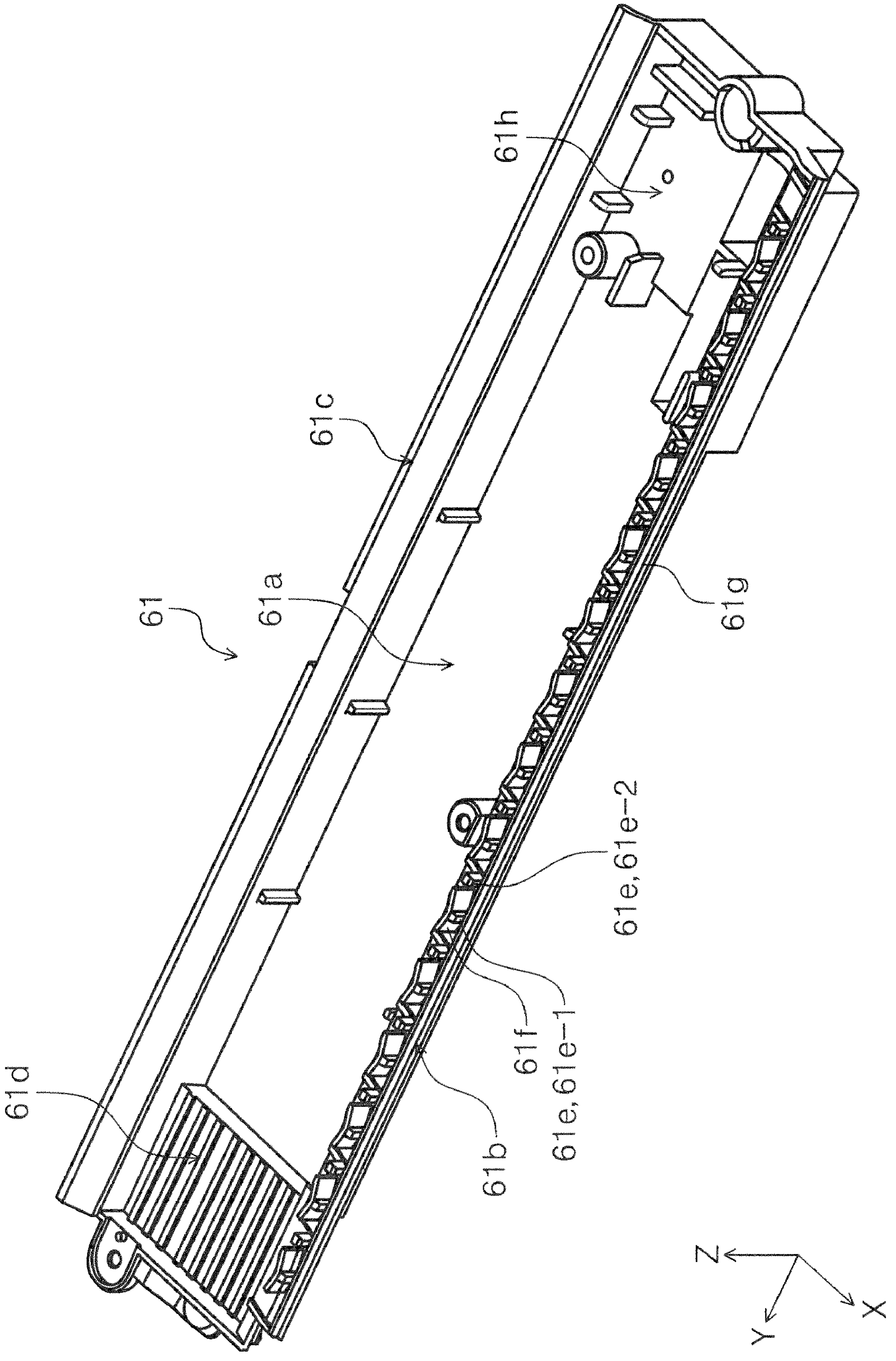
FIG. 5 is a perspective view of a liquid storage tray.
Figure 6:
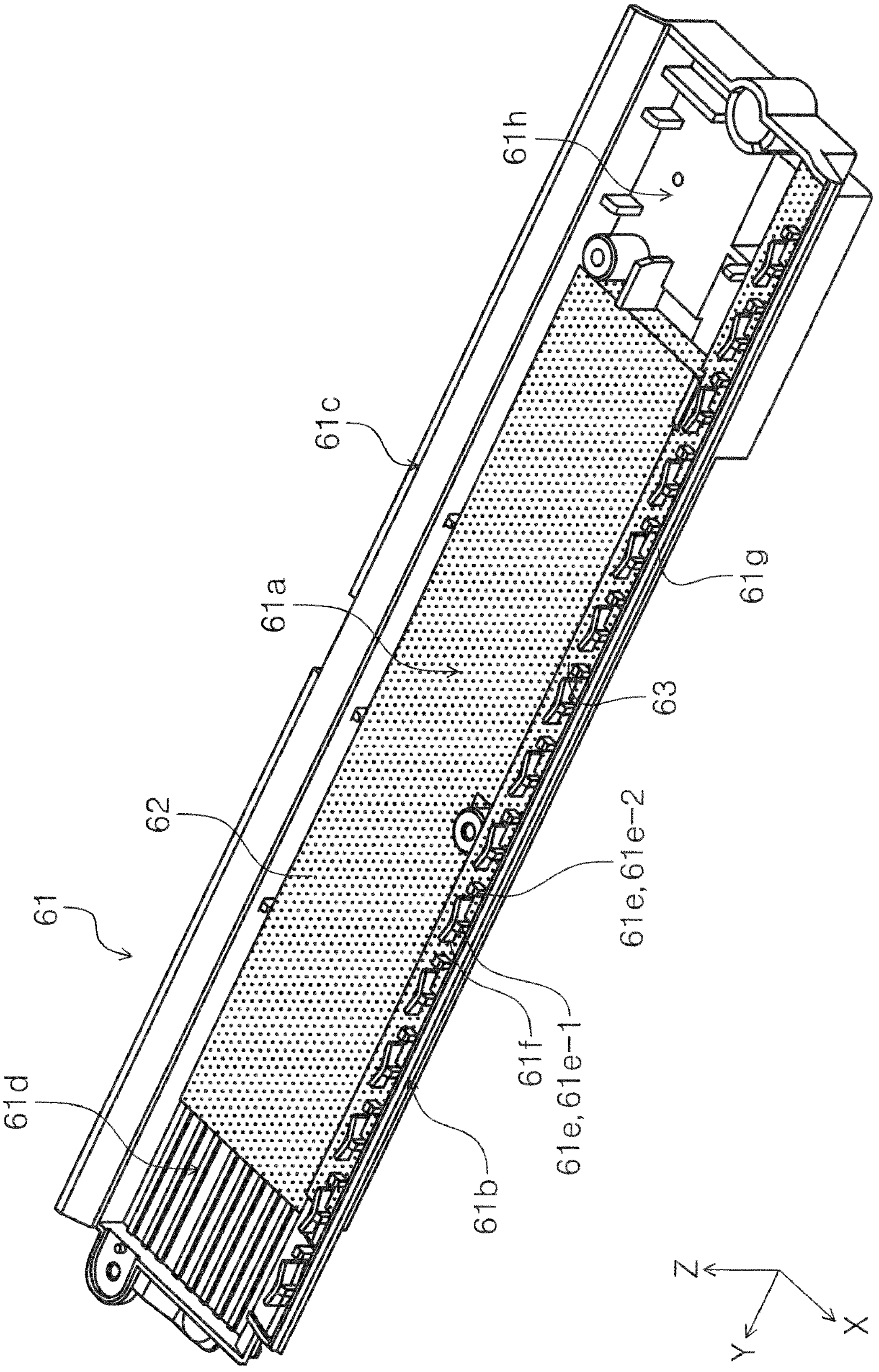
FIG. 6 is a perspective view of the liquid storage tray provided with a first liquid absorbing material and a second liquid absorbing material.
Figure 7:
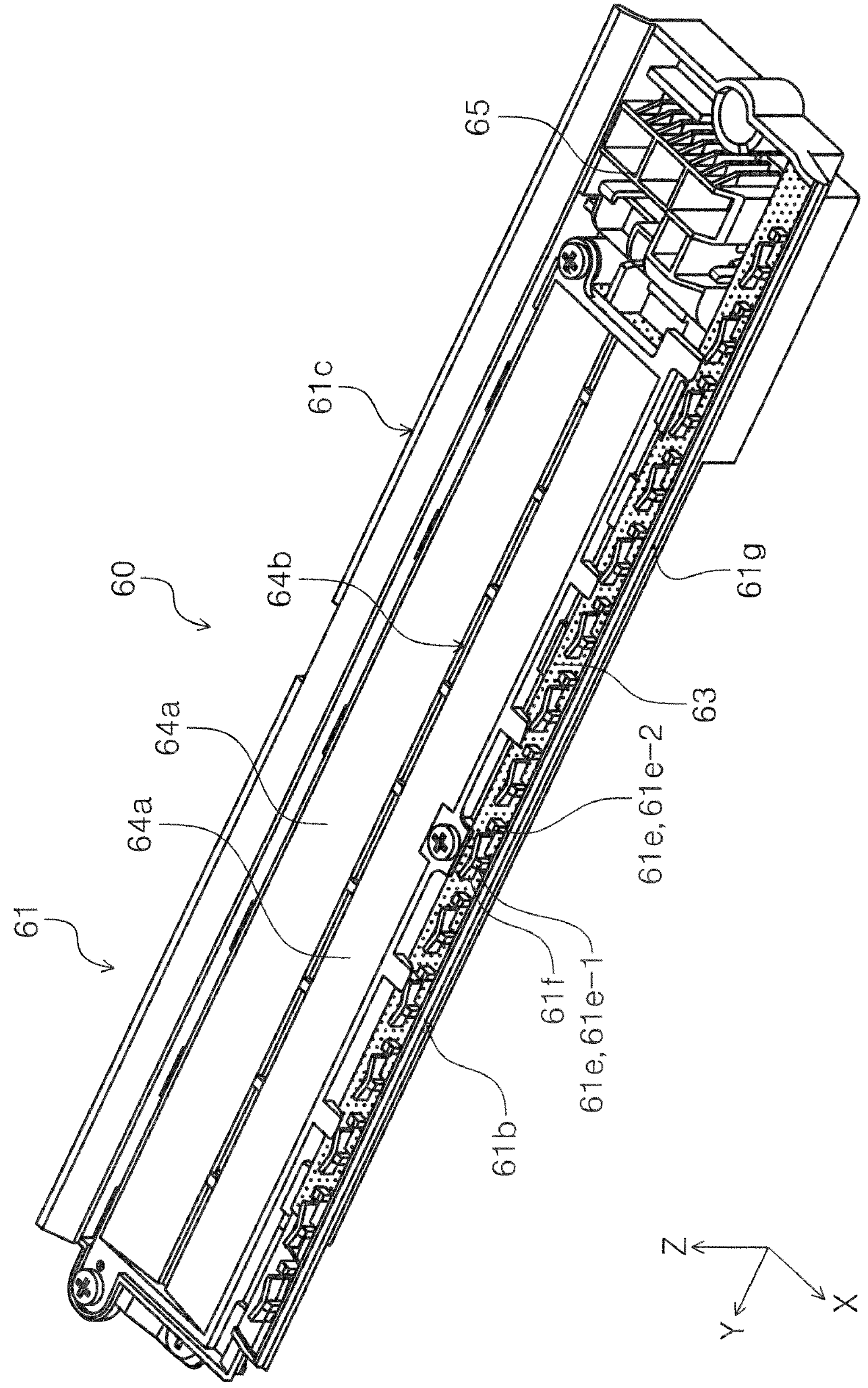
FIG. 7 is a perspective view of the liquid storage tray with a cover attached and a service part accommodated.

Next, as illustrated in FIG. 4, a path forming member 52 is provided in the +X direction with respect to the first liquid collecting portion 60. In the present embodiment, the path forming member 52 is formed by bending a metal plate so as to have a first portion 52*a* and a second portion 52*b*. A corner portion 52*e* where the first portion 52*a* and the second portion 52*b* intersect forms an upper end in the +Z direction at an end portion of the side door 50 in the +X direction. Further, the corner portion 52*e* forms a downstream end of the curved portion S of the inverting path T4.

The first portion 52*a* forms a part of the inverting path T4. A medium detection sensor 70 is provided at a position facing the first portion 52*a* (see FIG. 10). The medium detection sensor 70 is an optical sensor, includes a light emitting portion (not illustrated) that emits light to the first portion 52*a* and a light receiving portion (not illustrated) that receives light reflected from the first portion 52*a*, and detects passage of the medium based on a reflectance change during the passage of the medium.

The second portion 52*b* receives the ink and guides the ink to the first guide portion 61*b*. As illustrated in FIGS. 8 and 9, the second portion 52*b* has a recess 52*c* formed at a portion that transfers the ink to the first guide portion 61*b*. The first rib 61*e* fits into the recess 52*c*. A predetermined gap is formed between the recess 52*c* and the first rib 61*e*, and the path forming member 52 and the first rib 61*e* are not in contact with each other. However, the gap has a size that enables transfer of the ink from the recess 52*c* to the first rib 61*e*. The ink received by the second portion 52*b* is transferred from the second portion 52*b* to the first rib 61*e*, guided to the second liquid absorbing material 63, and absorbed by the second liquid absorbing material 63. Alternatively, the ink received by the second portion 52*b* is transferred from the second portion 52*b* to the first rib 61*e*, then to the second rib 61*f*, guided to the second liquid absorbing material 63, and absorbed by the second liquid absorbing material 63.

As described above, the first liquid collecting portion that collects the ink leaking from the line head 44 is provided vertically below the ejection surface 44*a* of the line head 44, on the side door 50. As a result, it is possible to prevent the ink from dripping downward in a state where the side door 50 is opened and staining the floor surface outside the installation region of the printer 1.

Figure 11:
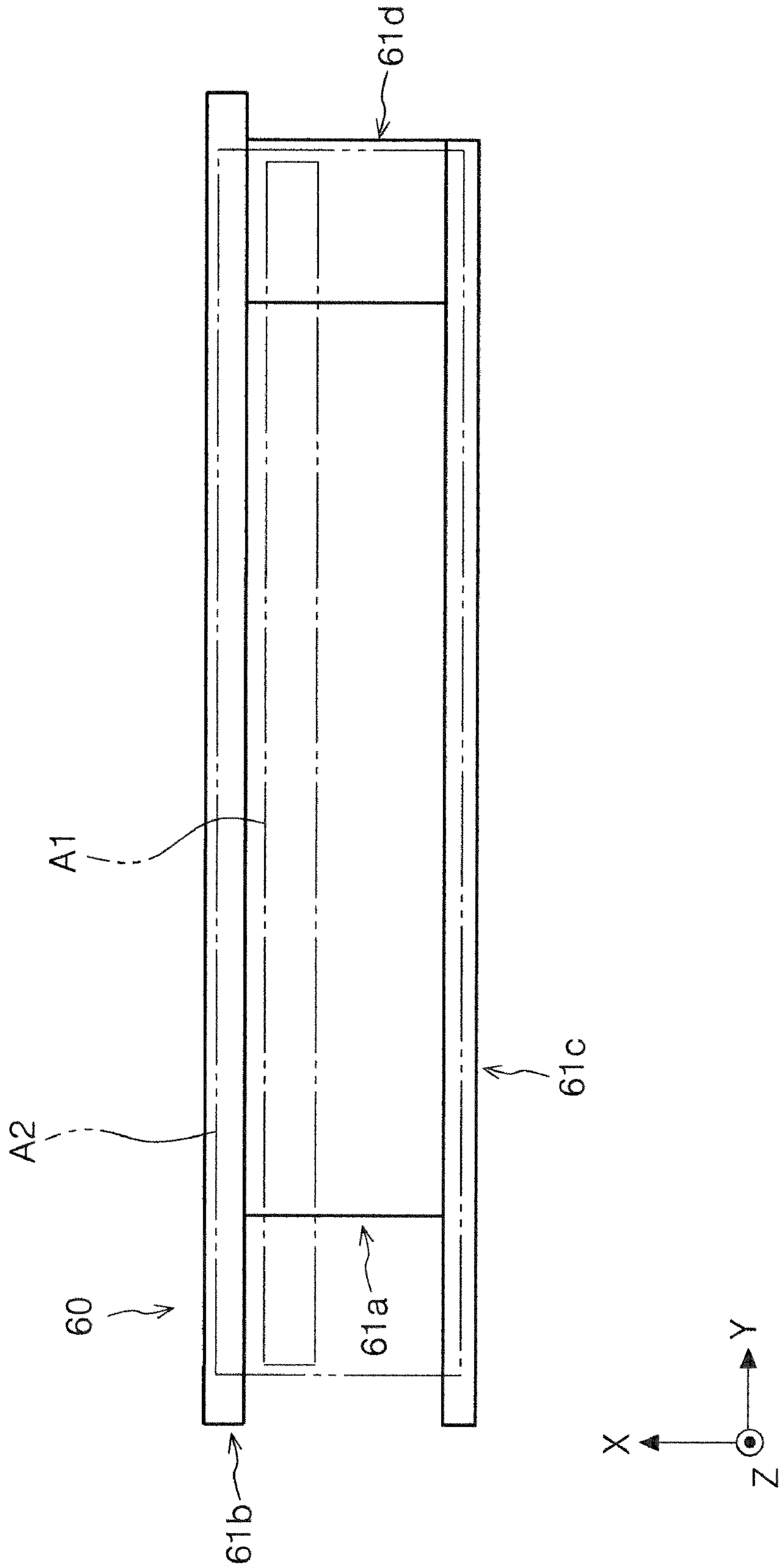
FIG. 11 is a diagram schematically illustrating a relationship between the first liquid collecting portion, a line head, and a transport belt as viewed from above.

Further, in the present embodiment, at least a part of the first liquid collecting portion 60 and at least a part of the ejection surface 44*a* overlap each other when viewed from above in a state where the side door 50 is closed. In FIG. 11, solid lines indicate regions of the storage portion 61*a*, the first guide portion 61*b*, the second guide portion 61*c*, and the third guide portion 61*d* included in the first liquid collecting portion 60, and a region A1 indicated by a line with alternating long and two short dashes is a region of the ejection surface 44*a* when viewed from the +Z direction. As illustrated, a part of the first liquid collecting portion 60 overlaps a part of the ejection surface 44*a*. With such an arrangement, the ink leaking from the line head 44 can be more reliably collected. The entire ejection surface 44*a* may overlap a part of the first liquid collecting portion 60 when viewed from above. Further, the ejection surface 44*a* does not have to overlap the first liquid collecting portion 60 when viewed from above. That is, the first liquid collecting portion 60 is only required to be positioned at a position where the ink leaking from the line head 44 can be collected. In the present embodiment, the transport belt 13 is used as an example of the medium support portion, but a platen that supports the medium may also be used.

Further, in the present embodiment, at least a part of the first liquid collecting portion 60 and at least a part of the transport belt 13 overlap each other when viewed from above in a state where the side door 50 is closed. A region A2 indicated by a line with alternating long and two short dashes in FIG. 11 is a region of the transport belt 13 when viewed from the +Z direction. As illustrated, a part of the first liquid collecting portion 60 and a part of the transport belt 13 overlap each other. With such an arrangement, the liquid leaking from the line head 44 can be more reliably collected. The entire transport belt 13 may overlap a part of the first liquid collecting portion 60 when viewed from above. Further, the transport belt 13 does not have to overlap the first liquid collecting portion 60 when viewed from above.

Figure 10:
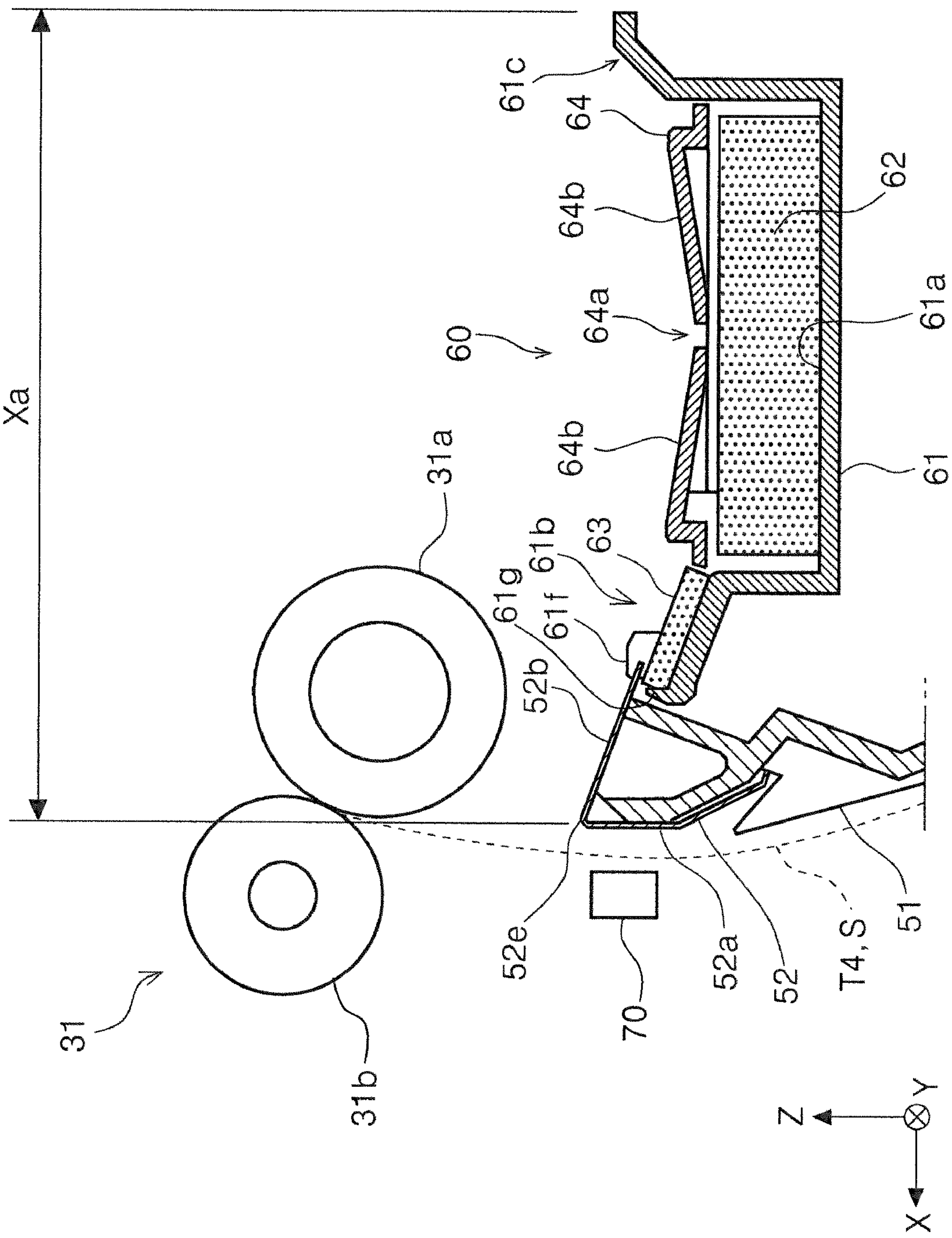
FIG. 10 is a cross-sectional view of the first liquid collecting portion.

In FIG. 10, a region Xa is an X-axis-direction region where the ink can be received by the first liquid collecting portion 60 and the second portion 52*b* of the path forming member 52. The transport roller pair 31 includes a drive roller 31*a* and a driven roller 31*b*, and a lower end portion of the drive roller 31*a* is positioned lower than a lower end portion of the driven roller 31*b* in the vertical direction. Therefore, when the ink leaking from the line head 44 falls onto the transport roller pair 31, the ink drips downward from the lower end portion of the drive roller 31*a*, but the lower end portion of the drive roller 31*a* is within the region Xa, and in particular, in the present embodiment, the entire drive roller 31*a* is positioned inside the region Xa. Therefore, the ink falling from the drive roller 31*a* can be appropriately collected.

Further, in the present embodiment, the inverting path T4 includes the path portion S that is vertically convex downward and that bends and inverts the medium upward, and the first liquid collecting portion 60 is arranged using an inner region of the path portion S (see FIG. 1). As a result, it is possible to suppress an increase in apparatus size by effectively utilizing the inner region of the path portion S.

The first liquid collecting portion 60 is positioned lower than the corner portion 52*e* in the vertical direction, the corner portion 52*e* being the downstream end of the path portion S. Here, in a case where the first liquid collecting portion 60 is positioned vertically higher than the corner portion 52*e* which is the downstream end of the path portion S, when the side door 50 is opened and closed, the first liquid collecting portion 60 may hinder opening and closing of the side door 50. However, in the present embodiment, the first liquid collecting portion 60 is positioned vertically lower than the corner portion 52*e* which is the downstream end of the path portion S, so that the first liquid collecting portion 60 hardly hinders opening and closing of the side door 50.

In the present embodiment, the first liquid collecting portion 60 includes the storage portion 61*a* that stores the ink and the first guide portion 61*b*, the second guide portion 61*c*, and the third guide portion 61*d* that extend outward from the storage portion 61*a* and guide the liquid to the storage portion 61*a*. Therefore, it is possible to expand a region for receiving the ink without increasing the size of the storage portion 61*a*. As a result, both expansion of the region for receiving the liquid and suppression of the increase in size of the apparatus can be achieved.

The first liquid collecting portion 60 also includes the cover 64 that covers the storage portion 61*a*. Accordingly, it is possible to prevent the user from inadvertently accessing the inside of the storage portion 61*a*. Further, in the present embodiment, the transport roller pair 31 is provided in the vicinity of the storage portion 61*a* as illustrated in FIG. 10. Here, when the first liquid absorbing material 62 becomes fluffy, there is a risk that the fluffy portion may be caught in the transport roller pair 31, but the provision of the cover 64 suppresses the occurrence of such a problem.

The cover 64 has the inclined surfaces 64*a* inclined toward the storage portion 61*a*. As a result, the ink falling onto the cover 64 can flow down to the storage portion 61*a*, and the ink falling onto the cover 64 can be effectively collected.

In the present embodiment, the first liquid absorbing material 62 that absorbs the ink is provided in the storage portion 61*a*. As a result, it is possible to reduce the risk of ink leaking from the storage portion 61*a*. One or both of the first liquid absorbing material 62 and the second liquid absorbing material 63 may be omitted. Further, a shape capable of retaining the ink, such as a rib, may be provided instead of the ink absorbing material.

In the present embodiment, the path forming member 52 that forms the inverting path T4 is provided. The path forming member 52 has the first portion 52*a* that forms a part of the inverting path T4 and the second portion 52*b* that receives the ink and guides the ink to the first guide portion 61*b*. The second portion 52*b* has the recess 52*c* formed at a portion that transfers the ink to the first guide portion 61*b*, and the first guide portion 61*b* has the first rib 61*e* fitting into the recess 52*c*. As a result, the path forming member 52 exhibits the function of receiving the ink and the function of guiding the received ink to the first guide portion 61*b*, so that the ink leaking from the line head 44 can be more reliably collected in the storage portion. The ink can be transferred from the second portion 52*b* to the first guide portion 61*b*. Therefore, it is possible to prevent the ink from leaking to other places without being transferred from the second portion 52*b* to the first guide portion 61*b*.

The second liquid collecting portion that collects the ink leaking from the line head 44 may be provided vertically below the first liquid collecting portion 60 on the lower side of the side door 50. Reference sign 60A in FIG. 1 indicates an example of the second liquid collecting portion. Although the second liquid collecting portion 60A may be omitted, the provision of the second liquid collecting portion 60A can more reliably prevent the ink from dripping downward in a state where the side door 50 is opened. In the example of FIG. 1, a part of the first liquid collecting portion 60 and a part of the second liquid collecting portion 60A overlap each other when viewed from above, but they do not necessarily have to overlap each other. The second liquid collecting portion 60A is only required to be positioned at a position where the ink leaking from the line head 44 can be collected.

It goes without saying that the present disclosure is not limited to the embodiments and modified examples described above, that various modifications are possible within the scope of the present disclosure described in the claims, and that the modifications also fall within the scope of the present disclosure.

What is claimed is:

1. A liquid ejecting apparatus comprising:

a liquid ejecting portion that ejects a liquid onto a medium which is transported and has an ejection surface from which the liquid is ejected and which intersects a horizontal direction;

a cap for maintenance of the liquid ejection portion;

a transport path that is disposed upstream of a position facing the liquid ejecting portion and is positioned vertically below the liquid ejecting portion; and an opening/closing member that is configured to be opened and closed with respect to a side surface of an apparatus body including the liquid ejecting portion, forms the transport path when closed, and at least partially opens the transport path when opened, wherein a liquid collecting portion that collects the liquid leaking from the liquid ejecting portion is provided on the opening/closing member at a position vertically below the ejection surface at a printing position, the liquid collecting portion includes a storage portion that stores the liquid and a guide portion that extends outward from the storage portion, the guide portion guides the liquid to the storage portion, and the storage portion includes an absorbing material that absorbs the liquid.

2. The liquid ejecting apparatus according to claim 1, wherein at least a part of the liquid collecting portion overlaps at least a part of the ejection surface when viewed from above in a state where the opening/closing member is closed.

3. The liquid ejecting apparatus according to claim 2, further comprising a medium support portion that supports the medium at the position facing the liquid ejecting portion, wherein a part of the medium support portion is positioned vertically below the liquid ejecting portion, and at least a part of the liquid collecting portion overlaps at least a part of the medium support portion when viewed from above in the state where the opening/closing member is closed.

4. The liquid ejecting apparatus according to claim 1, wherein the transport path includes a path portion that is vertically convex downward, the path portion bends the medium and inverts the medium upward, and the liquid collecting portion is arranged using an inner region of the path portion.

5. The liquid ejecting apparatus according to claim 4, wherein the liquid collecting portion is positioned vertically lower than a downstream end of the path portion.

6. The liquid ejecting apparatus according to claim 1, wherein the liquid collecting portion includes a cover that covers the storage portion.

7. The liquid ejecting apparatus according to claim 6, wherein the cover has an inclined surface inclined toward the storage portion.

8. The liquid ejecting apparatus according to claim 1, further comprising a path forming member that forms the transport path, wherein the path forming member has a first portion that forms a part of the transport path and a second portion that receives the liquid and guides the liquid to the guide portion, the second portion has a recess formed at a portion that transfers the liquid to the guide portion, and the guide portion has a rib fitting into the recess.

9. The liquid ejecting apparatus according to claim 1, wherein the liquid collecting portion serves as a first liquid collecting portion, and a second liquid collecting portion that collects the liquid leaking from the liquid ejecting portion is provided vertically below the first liquid collecting portion on a lower side of the opening/closing member.

10. The liquid ejecting apparatus according to claim 1, wherein the ejection surface intersects both the horizontal direction and a vertical direction.

* * * * *